United States Patent [19]
Hines

[11] 3,929,179
[45] Dec. 30, 1975

[54] INDICATOR DEVICE FOR INDICATING TREAD WEAR AND TIRE INCORPORATING THE INDICATOR

[75] Inventor: Edwin W. Hines, Slippery Rock, Pa.

[73] Assignee: Kennametal Inc., Latrobe, Pa.

[22] Filed: Dec. 5, 1973

[21] Appl. No.: 421,941

[52] U.S. Cl. ............................ 152/330 A; 116/114 Q
[51] Int. Cl.² ................................................ B60C 19/10
[58] Field of Search ...... 116/114 Q, 114; 152/330 R, 152/210, 330 A

[56] References Cited
UNITED STATES PATENTS

| | | | |
|---|---|---|---|
| 2,102,784 | 12/1937 | Bridges | 116/114 Q |
| 3,578,055 | 5/1971 | French et al. | 152/330 |
| 3,818,966 | 6/1974 | Baum | 152/210 |
| 3,827,885 | 8/1974 | Baum | 152/210 |
| 3,831,655 | 8/1974 | Cantz | 152/210 |

FOREIGN PATENTS OR APPLICATIONS

| | | | |
|---|---|---|---|
| 797,713 | 2/1936 | France | 116/114 Q |
| 1,480,472 | 4/1967 | France | 116/114 Q |

*Primary Examiner*—Jerry W. Myracle
*Assistant Examiner*—Marcus S. Rasco
*Attorney, Agent, or Firm*—Melvin A. Crosby

[57] ABSTRACT

A tread depth indicator for a vehicle tire consisting of a rod-like body having a head on one end and imbedded head end foremost into a blind hole in the tire tread with the outer end of the body substantially flush with the surface of the tire tread. The body of the indicator wears off at not less than the same rate as the tire tread when the tire rolls on a roadway and there is an outwardly facing region in the indicator located at about the maximum desired depth for the tread to wear down which provides an indication when the tread wears down to that depth. Advantageously, the body has a short pin of hard wear resistant material, such as cemented hard metal carbide material therein at the head end with the radially outer end of the pin forming the aforementioned region. The indication given by the indicator when the tread wears down to the aforementioned level is both visible by observation of the tire and is audible when the tire rolls on a roadway. Advantageously, the indicating means consists of a series of the tread depth indicators distributed laterally in one or two circumferentially spaced regions of the tire or, in the case of radial tires, in one or two circumferential regions of the tire in the side regions of the tire tread.

12 Claims, 8 Drawing Figures

INDICATOR DEVICE FOR INDICATING TREAD WEAR AND TIRE INCORPORATING THE INDICATOR

The present invention relates to the indication of the tread depth of tires, and is particularly concerned with a method of effecting such indication, and an indicator element employed for this purpose, and the combination of a vehicle tire with one or more of the aforementioned elements.

Most states now have certain depth of tread requirements for vehicle tires which means that a tire may only be used on a public thorofare when a certain minimum amount of tread material remains above the bottoms of the grooves formed in the tire tread.

In most cases, the minimum amount of tread above the bottoms of the grooves must be from one-sixteenth to one-eighth inch. In any case, a tire which has less than the aforementioned amount of tread remaining above the bottoms of the grooves therein is unsafe for use and ordinary prudence would indicate that such a tire be replaced.

It is customary for tire manufacturers to construct tires with what are referred to as "wear bars" therein and which consists of regions about 8 or 10 inches apart on the circumference of the tire wherein the grooves are stopped off in the radially inward direction at about the level of minimum allowable tread depth. Such wear bars will be exposed when the tire tread wears down to that level and upon observation it can be determined that a tire is worn to the point where it should be replaced.

The aforementioned wear bars are, however, not a reliable indication because they give no pronounced sound effect when the tire rolls on a roadway and are, furthermore, not capable of giving a prominent indication when the tire is observed.

With the foregoing in mind, the primary objective of the present invention is the provision of a method for indicating when a tire has worn down to the minimum desirable tread depth which is quite easily detected.

A further object is to provide such an indication which is readily audible when the tire rolls on a roadway.

A still further object is the provision of an indicator element for imbedding in a tire tread which will not in any way interfere with the operation of the tire but which will, when the tire tread has worn down the minimum desirable depth, give a readily discernable indication of this condition.

A still further object is the provision of a vehicle tire having incorporated therein indicating means for indicating when the tread depth reaches a minimum desired amount.

BRIEF SUMMARY OF THE INVENTION

An indicator element according to the present invention comprises a body having a head on one end and adapted for being inserted into a blind hole in a tire tread head end foremost with the head disposed near or radially inwardly from the minimum desired tread thickness and with the outer end of the element disposed near or at the tread surface.

The indicator wears down at not less than the rate at which the tire tread wears as the tire rolls on a roadway and at about the depth in the tire tread at which it is desirable for the tire to be discarded, which is an outwardly facing axial region in the body which will provide a readily discernable indication that the tread portion of the tire has worn down the maximum desired amount.

The indication provided by the element is both a visual indication that can be detected by observing the tire and an audible indication which is detected when the tire rolls on a roadway.

The particular element is subject to considerable variation but may consist of a tubular metal body having a head on one end which is at the radially inner end of the element when it is mounted in the tire tread and with a pin of cemented hard metal carbide disposed in the body at the head end. The outer end of the pin forms the outwardly facing axial region of the element which provides the aforementioned indication.

The objects referred to above as well as still other objects and advantages of the present invention will become more apparent upon reference to the following detailed specification taken in connection with the accompanying drawings in which.

DETAILED DESCRIPTION OF THE INVENTION

Figure 1:
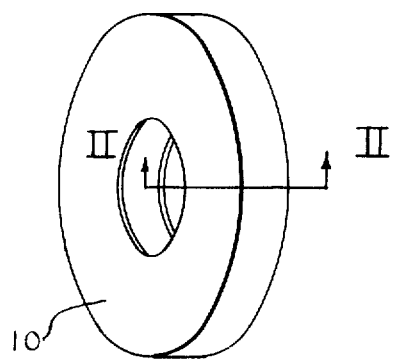
FIG. 1 is a perspective view of a vehicle tire having tread depth indicator elements according to the present invention mounted therein.

Referring to the drawings somewhat more in detail, tire 10 in FIG. 1 is a substantially conventional vehicle tire and in the circumferential region thereof indicated by section line II—II, the tread portion of the tire has imbedded therein indicator elements according to the present invention.

Figure 2:
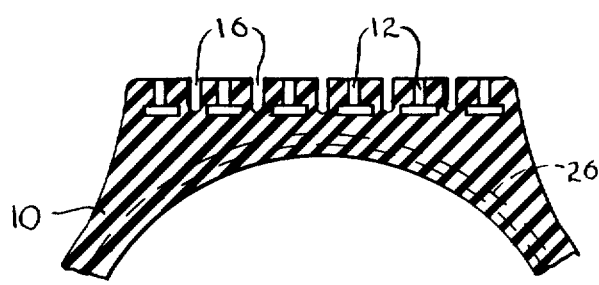
FIG. 2 is a section indicated by line II—II on FIG. 1 and showing more in detail the arrangement in the tread portion of the tire of the indicator elements according to the present invention.

FIG. 2 shows a fragment of the tire 10 in cross section, and the indicator elements 12 according to the present invention will be seen to be mounted in the tread portion 14 of the tire in regions thereof between the grooves 16. Preferably, the tire mold is formed so that there is available a solid uninterrupted block of tread material on the order of about one-half to three-fourths inches square for receiving each of the indicator elements.

Advantageously, the mold in which the tire is formed is provided with pins which form blind holes in the aforementioned rubber blocks and into which the indicator elements are placed after the tire has been cured and removed from the mold.

Figure 3:
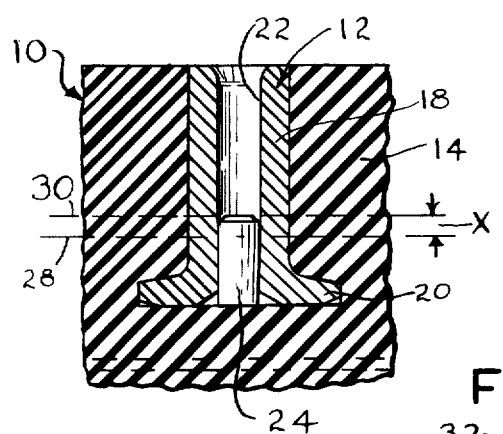
FIG. 3 is a fragmentary sectional view drawn at greatly enlarged scale showing more in detail the construction of an indicator element according to the present invention and the disposition thereof in the tread portion of a tire.

As will be seen in FIG. 3, each element 12 comprises a body part 18 having a flange-like head 20 on one end. The body part may be tubular and, thus, consists of a central axial bore 22 extending completely therethrough. The body may be made of any material which will wear at a rate not less than that of the material of the tread portion 14 as the tire rolls on a roadway. For example, compacted and sintered iron powder is a satisfactory material to employ for the body 18.

At the head end of the body 18, there is disposed inside the body a pin 24 which may consist of a cemented hard carbide material having a wear rate substantially less than that of the material from which the tread portion 14 of the tire is made. It will be observed in FIGS. 2 and 3 that the head ends of the indicator elements are disposed outwardly from any cord layers 26 that may be embodied in the tire and which may include reinforcing layers or breaker strips as well as the cord layers that extend from bead to bead in the tire casing. The entire indicator element is, thus, disposed within the body of tread material and, in this manner, does not in any way create any hazard to the cord portion of the tire.

In FIG. 3, the line 28 may indicate the line of minimum desirable tread depth. As mentioned, this may be from one-sixteenth to one-eighth inch above the bottoms of the grooves 16. In FIG. 3, it will be noted that by the time the tire tread wears down to the level indicated by line 28, the axially outer end of pin 24 is exposed.

This axially outer end of the pin 24 may be exposed at the level indicated by line 28 or it may be exposed at a level indicated by line 30 disposed a short distance radially outwardly from the level 28, for example, one-sixteenth inch or some other dimension as indicated by reference character in FIG. 3.

The reason for permitting the pin 24 to protrude a short distance outwardly from the minimum depth to which it is desired to wear the tread is that with the pin protruding a small amount, an audible indication of the worn condition of the tire tread will be provided when the tire rolls on a roadway. With the indicator elements arranged at a single circumferential region of the tire, the indication provided by the indicator elements as the tire rolls on a roadway will be quite pronounced.

Figure 4:
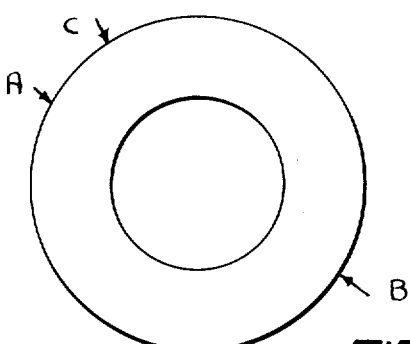
FIG. 4 is a side view of a tire indicating by arrows different locations for receiving indicator elements.

FIGS. 1 and 2 indicate indicator elements installed in the tread portion of a tire at only one circumferential region, but as will be seen in FIG. 4, various locations are possible as indicated by arrows A, B and C. The indicator elements can advantageously be located in any single one of the locations or in any combination thereof, preferably, in not more than two of the locations.

Figure 5:
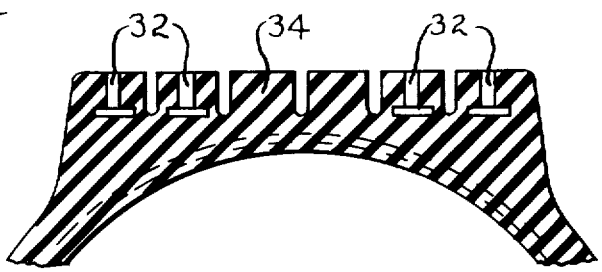
FIG. 5 is a fragmentary sectional view showing the positioning of indicator elements at the sides of the tread portion of a radial tire.

The tire schematically illustrated in FIG. 2 is a more or less conventional bias ply tire. Radial type tires are also quite popular, and in the case of radial tires, it is preferable for the indicator elements to be disposed as shown at 32 in FIG. 5, and wherein the indicator elements are near the side regions of the tread portion 34 of the tire.

Figure 6:
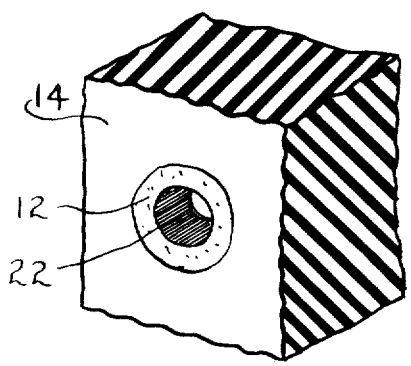
FIG. 6 is a schematic perspective view showing the appearance of an indicator element according to the present invention before the tread portion has worn down to the desired minimum depth.
Figure 7:
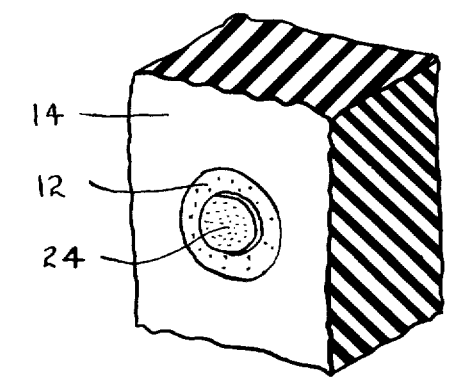
FIG. 7 is a view like FIG. 6 but shows the appearance of the indicator element when the tread portion has worn down to the desired minimum depth.

FIGS. 6 and 7 schematically illustrate the manner in which an indicator element of the type disclosed herein operates.

In FIG. 6, the indicator element 12 is shown in the manner in which it appears before the radially outer end of pin 24 is exposed. It will be noted that the hole in the center of the radially outer end of the body provides a dark region which contrasts with the light color of the end of the pin so that the tread condition can readily be determined by observing the tire tread.

In FIG. 7, the axially outer end of pin 24 has become exposed by the tread wearing down and no dark region now exists in the center of the outer end of the pin but the entire outer end is about the same color.

Furthermore, as wear has progressed somewhat beyond the point of exposure of the outer end of pin 24, the outer end of the pin will protrude somewhat above the level of the tread and will, thus, strike on a road surface on which the tire rolls and provide the aforementioned audible indication.

From the foregoing, it will be seen that a reliable tread depth indicator is provided according to the present invention which can be incorporated in any type tire. The tread depth indicators are relatively light and do not create any unbalanced condition of the tire and are quite economical to use because only a few are required for a single tire.

While metal is the preferred material for the body of the indicator, it is conceivable that other materials also could be employed. The indicator is shown as extending from the bottom of the blind hole to the surface of the tread, and this is of merit in respect of seating the indicator firmly in the tread material. When the indicator element is first placed in the tread material, the extremely strong rubber-like material of the tire tread does not readily conform to the shape of the head of the indicator element, but after the tire rolls on a roadway for a relatively short distance, the radial movement of the indicator element in the tire tread will bring about a firm seating thereof in the tread material so that it will remain firmly fixed in the tread material throughout the life of the tire and will not tilt in the tire or become dislodged therefrom.

The indicator element can, thus, be relied upon to give a proper indication of the maximum desired amount of wearing off of the tire tread in use.

The material of the pin 24 has been referred to as a cemented hard metal carbide, but it will be understood that the material of the pin does not have to be extremely hard but merely hard enough to wear off at a rate less than the rate of wear of the tread material so that some protrusion of the pin from the tread material will result when the tread material wears down whereby the aforementioned audible signal is created when the tire rolls on a roadway, especially on a dry paved roadway.

As to the particular size of the indicator element, this can vary in length in conformity with the amount of permissible tread wear on a respective tire and it is believed that about three or four different lengths would adequately emcompass existing vehicle tires.

A particular size for the indicator might be one in which the shank portion of the body is 0.200 inches in diameter with the flange-like head being 0.345 inches in diameter and with the cylindrical region at the periphery of the head being from about 0.052 to about 0.060 inches in axial dimension.

The pin 24 is tapered inwardly toward the bottom and at the bottom might have a diameter of about 0.081 to 0.084 inches and at the upper end a diameter of about 0.092 to 0.095 inches with the pin being about 0.190 inches in length. The taper of the pin is advantageously about 0.050 inches per inch and at the radially outer end of the pin there may be a dome formed to a radius of about 0.200 inches.

The tubular bore extending axially through the stud body advantageously tapers inwardly toward the bottom and at the extreme end of the bore remote from the head the bore may have a short region as large as 0.095 inches for ease of introducing the pin into the bore.

It is possible to employ a pin as short as 0.130 to about 0.140 inches in length and satisfactory results will be obtained. The head end of the pin is advantageously about flush with the side of the head which faces away from the shank of the stud body because this provides for easy assembly of the pin with the body.

The pin could be brazed or cemented into the bore in the body if so desired, and the bore in the body could extend only partway therethrough from the head end if so desired so long as it is large enough to receive the pin and extends somewhat beyond the radially outer end of the pin.

The overall length of the body of the indicator might be from about 0.400 inches to about 0.600 inches but could, as mentioned, be formed to different lengths to meet different specific conditions.

It has been mentioned previously that most tires embody circumferential regions which are referred to as "wear bars" and which become exposed across the entire width of the tire tread when the tire tread is worn down to about the maximum desired degree. The indicator elements according to the present invention could advantageously be mounted in the circumferential region of the tire occupied by a wear bar or in more than one of the said circumferential regions, thus, availing of the solid transversing bar of tread material for receiving the head ends of the indicator elements.

Figure 8:
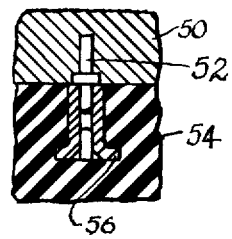
FIG. 8 is a fragmentary sectional view showing how indicator elements according to the present invention could be molded into a tire.

FIG. 8 shows one manner in which tread depth indicators according to the present invention could be installed in a tire tread. In the case of the installation of tire studs in a tire tread, the tire mold is provided with pins which form blind holes in the tire tread during the tire molding and curing process.

These blind holes for studs are smaller in diameter than the studs and are expanded when the stud is installed therein and permitted to collapse about the stud in order to retain the stud in upright position in the tire tread. It has been found that it is necessary to have the tread rubber in compressed state around the tire stud in order properly to support the tire stud, and it has, accordingly, not been possible to mold the studs into the tire tread.

With the tread depth indicator of the present invention, however, no anti-skid properties are obtained, and the outer end of the body of the tread depth indicator wears off at least as rapidly as the tread rubber. Thus, the tread depth indicators do not become loose in the tread rubber as the tire rolls on a roadway as will tire studs if the studs are not supported by surrounding compressed rubber as described above.

For the foregoing reasons, it is possible to mold the tread depth indicators in the tire tread at the time of molding and curing the tire. FIG. 8 shows a fragment of a tire mold 50 having a pin 52 set in the mold and projecting into the region in which the tire tread 54 is molded.

The pin is adapted to enter the hole in the outer end of the body of the tread depth indicator 56 and will support the tread depth indicator during the curing of the tread material. When the cured tire is removed from the mold, the pins 52 readily slip out of the outer ends of the bodies of the tread depth indicators leaving the tread depth indicators imbedded in the tread at the proper position.

Modifications may be made within the scope of the appended claims.

What is claimed is:

1. A tread wear indicator adapted for being mounted in a blind hole in a tire tread and operable to provide an audible indication when the tire tread is worn down a predetermined amount, said indicator comprising: a rod-like body having a flange near one end forming a head, and a hard wear resistant element in said body near said one end, said body being adapted to be introduced into a blind hole in a tire tread head end foremost with the head near the bottom of the hole and the other end of the body substantially flush with the tread surface, the said body being formed of a material which will wear off at a rate not less than the rate of wear of the tread and said wear resistant element having a wear rate substantially less than the wear rate of the tread providing said audible indication.

2. A tread wear indicator according to claim 1 in which the radially outer end of said wear resistant element is disposed near the level in the tire tread at which an indication of tread wear is desired.

3. A tread wear indicator according to claim 1 in which said body has a substantially cylindrical recess extending axially therein from the head end and said wear resistant element is substantially shorter than said body and is fixed in said recess with the radially inner end near the said head end of the body.

4. A tread wear indicator according to claim 3 in which said recess extends axially completely through said body.

5. A tread wear indicator according to claim 3 in which said wear resistant element is press fitted into said recess.

6. A tread wear indicator according to claim 1 in which said body is metal and said wear resistant element comprises cemented hard metal carbide.

7. A tread wear indicator according to claim 1 in which said body is compacted and sintered powdered metal and said wear resistant element comprises cemented hard metal carbide.

8. In combination a vehicle tire having a tread portion, and tread wear indicator means for indicating when the tread portion has worn down a predetermined amount, said tread wear indicator means comprising at least one rod-like body having a flange near one end forming a head, and a hard wear resistant element in said body near said on end, said body being formed of material which will wear off at a rate not less than the rate of wear of the tread and said wear resistant element having a wear rate substantially less than the wear rate of treads, said rod-like body imbedded in a blind hole of said tread portion at at least one circumferential region thereof with the head near the bottom of the hole and the other end of the body substantially flush with the tread surface and said wear resistant element having a radially outwardly facing axial region which is disposed near that level in the tread portion that it is desired to indicate a worn condition of the tread portion, said region of said rod-like body when exposed by the tread portion wearing down to the said level providing a discernable indication, the indication provided by said wear resistant element comprising an indication which is audible when the tire rolls on a roadway.

9. The combination according to claim 8 in which said body is tubular and said wear resistant member is a pin mounted in the head end of said body on the axis thereof.

10. The combination according to claim 8 in which said hard wear resistant member is a cemented hard metal carbide pin.

11. The combination according to claim 8 in which said hard wear resistant member is a cemented hard metal carbide pin, and said body is compacted and sintered powdered metal.

12. The combination according to claim 8 in which the indication provided by said wear resistant element includes an indication which is also visible by observation of the tread portion.

* * * * *